United States Patent
Gajda et al.

(10) Patent No.: US 12,445,037 B2
(45) Date of Patent: Oct. 14, 2025

(54) DCDC CONVERTERS

(71) Applicant: Nordic Semiconductor ASA, Trondheim (NO)

(72) Inventors: Bartosz Gajda, Trondheim (NO); Frode Pedersen, Trondheim (NO); Samuli Hallikainen, Oulu (FI)

(73) Assignee: Nordic Semiconductor ASA, Trondheim (NO)

( * ) Notice: Subject to any disclaimer, the term of this patent is extended or adjusted under 35 U.S.C. 154(b) by 241 days.

(21) Appl. No.: 18/031,862

(22) PCT Filed: Oct. 13, 2021

(86) PCT No.: PCT/EP2021/078348
§ 371 (c)(1),
(2) Date: Apr. 13, 2023

(87) PCT Pub. No.: WO2022/079117
PCT Pub. Date: Apr. 21, 2022

(65) Prior Publication Data
US 2023/0402919 A1    Dec. 14, 2023

(30) Foreign Application Priority Data
Oct. 14, 2020   (GB) .................................. 2016292

(51) Int. Cl.
*H02M 1/00*       (2007.01)
*H02M 3/158*      (2006.01)
(Continued)

(52) U.S. Cl.
CPC ......... *H02M 1/009* (2021.05); *H02M 1/0045* (2021.05); *G05F 1/577* (2013.01); *H02M 3/1566* (2021.05); *H02M 3/158* (2013.01)

(58) Field of Classification Search
CPC .... H02M 1/0045; H02M 1/009; H02M 3/156; H02M 3/1566; H02M 3/158; G05F 1/577
See application file for complete search history.

(56) References Cited

U.S. PATENT DOCUMENTS 11,881,778 B2   1/2024  Hallikainen
2006/0221649 A1  10/2006  Yamanaka et al.
(Continued)

FOREIGN PATENT DOCUMENTS

EP  2 622 723 B1  1/2019
EP  3 432 454 A1  1/2019
(Continued)

OTHER PUBLICATIONS

Chen et al., "Single-Inductor Quad-Output Switching Converter With Priority-Scheduled Program for Fast Transient Response and Unlimited Load Range in 40 nm CMOS Technology," in IEEE J Sol-St Cir, vol. 50, No. 7, pp. 1525-1539, Jul. 2015, doi: 10.1109/JSSC.2015.2422071. (Year: 2015).*

(Continued)

*Primary Examiner* — Fred E Finch, III
(74) *Attorney, Agent, or Firm* — Klarquist Sparkman, LLP

(57) ABSTRACT

A circuit portion comprises a DCDC converter that provides current to one of a plurality of loads at a time. A controller detects when a voltage across an under-supplied load of the plurality of loads is below a first threshold. Channel logic circuitry provides current from the converter to the under-supplied load in response to the controller detecting that the voltage is below the first threshold. A voltage regulator provides current to the under-supplied load when the voltage is below a second threshold.

12 Claims, 3 Drawing Sheets

(51) Int. Cl.
  *G05F 1/577* (2006.01)
  *H02M 3/156* (2006.01)

(56) References Cited

U.S. PATENT DOCUMENTS

| | | |
|---|---|---|
| 2008/0231115 A1 | 9/2008 | Cho et al. |
| 2012/0080945 A1* | 4/2012 | Vasadi .................. H02M 3/158 307/31 |
| 2012/0286576 A1 | 11/2012 | Jing et al. |
| 2013/0082673 A1 | 4/2013 | Sako |
| 2015/0062108 A1 | 3/2015 | Archibald |
| 2015/0188407 A1* | 7/2015 | Golder .................. H02M 1/088 307/31 |
| 2016/0379581 A1 | 12/2016 | Takenaka |
| 2017/0093278 A1 | 3/2017 | Unno et al. |
| 2017/0373597 A1 | 12/2017 | Kato et al. |
| 2019/0199215 A1 | 6/2019 | Zhao et al. |
| 2021/0152082 A1* | 5/2021 | Ozanoglu ........... H02M 1/0009 |
| 2022/0115950 A1 | 4/2022 | Hallikainen |
| 2022/0115951 A1 | 4/2022 | Hallikainen |
| 2023/0216409 A1* | 7/2023 | Ravi .................. H02M 1/0025 323/282 |

FOREIGN PATENT DOCUMENTS

| | | |
|---|---|---|
| GB | 2600389 A | 5/2022 |
| JP | 2018074850 | 5/2018 |

OTHER PUBLICATIONS

International Search Report and Written Opinion for PCT/EP2021/078348, mailed Jan. 21, 2022, 16 pages.
IPO Search Report under Section 17(5) for GB2016292.1, mailed Mar. 25, 2021, 3 pages.
Martinez et al., "Single-Input Dual-Output (SIDO) Linear-Assisted DC/DC Converter," XVI Annual Seminar on Automation, Industrial Electronics and Instrumentation, 2008, 6 pages.

* cited by examiner

DCDC CONVERTERS

CROSS REFERENCE TO RELATED APPLICATIONS

This is the U.S. National Stage of International Application No. PCT/EP2021/078348, filed Oct. 13, 2021, which was published in English under PCT Article 21 (2), which in turn claims the benefit of Great Britain Application No. 2016292.1, filed Oct. 14, 2023.

BACKGROUND OF THE INVENTION

The present invention relates to a single-input multiple output (SIMO) step-down DCDC "Buck" converter.

Modern portable electronic devices are typically provided with a power source such as a battery that acts as a direct current (DC) power supply for the various electronic components with the device. However, typically these components will have different voltage requirements and so it is conventional for such devices to employ one or more DCDC converters that step a nominal voltage associated with the power supply down to a voltage appropriate for the different electronic components. While this could be achieved by using a potential divider network (e.g. a series of resistors) to create a number of "taps" having different voltages, this is highly inefficient as energy is simply wasted as heat dissipated across the resistors.

One alternative arrangement known in the art per se is a Buck converter. A Buck converter circuit utilises an inductor-capacitor or "LC" circuit which is periodically connected to and disconnected from the power supply (e.g. by intermittently opening and closing a switch, typically implemented as a transistor referred to as the "high-side" (HS) transistor) by a driver in order to step down the voltage. This can be seen as an electrical equivalent to a mechanical flywheel, wherein energy is periodically input to the system to keep it outputting energy at a steady rate. The ratio of the output voltage to the input voltage can be adjusted by altering the duty cycle of a pulse width modulated (PWM) or pulse frequency modulated (PFM) drive signal produced by the driver that is applied to the gate of the high-side transistor in order to turn the transistor on or off.

A synchronous buck converter circuit replaces what is known as the "freewheeling" or "flyback" diode with a second transistor, often referred to as the "low-side" (LS) transistor. The driver then turns on the low-side transistor when turning on the high-side transistor and vice versa by applying appropriate PWM or PFM drive signals to the high- and low-side transistors to control them so as to intermittently couple the LC circuit to the input voltage. This improves the efficiency of the buck converter in exchange for increasing the bill of materials associated with the circuit. The efficiency of the DCDC converter increases for increased output currents.

A Buck converter may be implemented in a circuit, e.g. on a system-on-chip (SoC), and arranged to deliver power to multiple loads (i.e. a Single-Input Multiple Output (SIMO) Buck converter). In such systems, the power could be rotated asynchronously between the output loads in hysteretic (PFM) mode. In this mode, power is supplied to each load on request. If none of the outputs request charge, the converter idles. Alternatively, PWM mode may be used, in which the supply of power may be rotated between each load in turn according to a fixed repeated sequence, such that the load switching is synchronised with a clock signal. Operating the converter in this mode allows a predictable switching noise spectrum to be achieved.

It is common for SoCs to experience large variations in loading depending on the individual operation of the constituent components. In conventional arrangements, if a DCDC converter is used to provide power to the loads of the SoC, it is necessary to dimension the DCDC converter for the highest-load scenario, which may occur infrequently. This can be a source of significant inefficiency in terms of cost and power.

The present invention seeks to provide an improved circuit for delivering power to multiple loads efficiently using a DCDC converter, wherein the above-identified deficiencies are mitigated.

SUMMARY OF THE INVENTION

When viewed from a first aspect, the invention provides a circuit portion comprising:
 a DCDC converter arranged to provide current from an output of the converter to one of a plurality of loads at a time;
 a controller configured to detect when a voltage across an under-supplied load of the plurality of loads from the DCDC converter is below a first threshold;
 channel logic circuitry configured to provide current from the output of the converter to the under-supplied load in response to the controller detecting that the voltage is below the first threshold; and
 a voltage regulator configured to provide current to the under-supplied load when the voltage is below a second threshold.

Thus, it will be appreciated that the present invention provides a circuit comprising channel logic circuitry that is configured to direct the current output by a DCDC converter to one of a plurality of loads when it is determined that the voltage in that load is lower than a first threshold. When the voltage falls below a second threshold, a voltage regulator is configured to supplement the current provided to the load.

This means that, when the voltage provided to a first load begins to fall, the channel logic circuitry is configured to respond by providing the load with more current from the DCDC converter, thereby increasing the voltage provided to the load. However, as discussed above, in high-load scenarios the maximum current that can be provided by the DCDC converter may be insufficient for meeting the requirements of all of the loads. The current provided by the DCDC converter may be used to charge a capacitor, which subsequently discharges to provide current to the first load. If the current required by the load is greater than the current provided by the capacitor, the voltage across the first load can fall even further.

In this case, the voltage regulator of the present invention is configured to supplement the current provided to the first load by the DCDC converter, thereby raising the voltage provided to the load. This can prevent the operation of the SoC from being diminished as a result of the DCDC converter failing to provide the required power to each of the loads.

In some embodiments, the circuit portion is arranged on an integrated circuit, e.g. a system-on-chip (SoC). The circuit portion may provide an input voltage to the DCDC converter and/or to the voltage regulator. The plurality of loads may comprise, by way of non-limiting examples, any of an analogue-to-digital converter (ADC), a comparator, an oscillator, a radio transmitter and/or receiver, a power amplifier, a processor or memory.

The DCDC converter may be a step-down (e.g. "Buck") converter. The DCDC converter may comprise a high side (HS) transistor and a low side (LS) transistor.

The DCDC converter may comprise an inductor. The DCDC converter may be configured to charge the inductor when the HS transistor is turned on (and the LS transistor is turned off) and to discharge the inductor when the LS transistor is turned on (and the HS transistor is turned off).

The DCDC converter may be configured to operate in Discontinuous Conduction Mode (DCM). In some embodiments, the circuit portion comprises duty control logic circuitry configured to turn on or turn off the LS transistor and the HS transistor of the DCDC converter. The duty control logic circuitry may be configured to operate the DCDC converter in Discontinuous Conduction Mode (DCM). In DCM, the current in the inductor reduces to zero between charging events of the inductor. This is in contrast to Continuous Conduction Mode (CCM), in which the current is continuously flowing in the inductor. Operating the DCDC converter in DCM is beneficial in SIMO implementations as this avoids poor cross-regulation between output channels in unequal loading conditions.

The circuit portion may comprise a duty module configured to determine a duty cycle for the DCDC converter. The duty cycle defines a ratio of time for which the inductor is charged and the time for which the inductor is discharged. The duty module may comprise a pulse-width modulation (PWM) module. The duty module may comprise a pulse-frequency modulation (PFM) module. The duty module may be arranged to receive a reference voltage indicative of a desired voltage to be provided to one or more of the plurality of loads. The duty module may be configured to determine the duty cycle according to the reference voltage. The duty control logic circuitry may be configured to turn on or turn off the HS transistor or the LS transistor depending on the determined duty cycle. The duty module may comprise a comparator configured to compare the voltage provided to one or more of the plurality of loads with a respective reference voltage. The duty module may be configured to use this comparison to control the duty cycle of the DCDC converter.

The duty control logic circuitry may be configured to monitor the current in the inductor of the DCDC converter. The duty control logic circuitry may be configured to turn off the LS transistor when the current in the inductor reduces to zero. The duty control logic circuitry may comprise a zero-cross comparator configured to change output state when the current in the inductor reduces to zero. The duty control logic circuitry may be configured to turn off the LS transistor when the zero-cross comparator changes output state.

The duty control logic circuitry may be configured to compare the current through the inductor with a maximum-current threshold and, in response to determining that the current through the inductor is greater than the maximum-current threshold, the duty control logic circuitry may be configured to turn off the HS transistor and to turn on the LS transistor, thus causing the inductor to discharge. In hysteretic (PFM) operation of the DCDC converter, this sets a fixed amount of charge that is delivered to each load per cycle. This can also help to avoid damage to the inductor caused by excessive charging.

In some embodiments the controller is configured to monitor the voltage of each of the plurality of loads. Each of the plurality of loads may be associated with a respective target voltage (e.g. a minimum target voltage) at, or above, which it is desirable for the respective load to operate. In other embodiments, each of the plurality of loads is associated with a respective target voltage range within which it is desirable for the voltage across the respective load to remain. In some embodiments, the target voltage range (for each of the plurality of loads) is defined between a minimum target voltage and an upper target voltage. The circuit portion may be arranged to deliver one or more reference voltages, representative of the target voltage or the target voltage range, to the controller.

The target voltage (range), and thus the minimum target voltage (or the upper target voltage), may be different for each of the plurality of loads. The first threshold may be equal to the minimum target voltage.

The under-supplied load is one of the plurality of loads that is receiving a voltage that is lower than the first threshold. The under-supplied load may be the one of the plurality of loads that is presently receiving current from the DCDC converter, or may be a different one of the plurality of loads. This means that the voltage across the load may be below the first threshold even while the load is being provided with current from the DCDC converter. In this case the voltage across the load may eventually fall below the second threshold and thus trigger supplementary supply from the voltage regulator.

The controller may be configured, in response to detecting that the voltage across the under-supplied load is lower than the first threshold, to issue a channel request signal that identifies the under-supplied load. The channel request signal may be used by the channel logic circuitry to ensure that the identified load is scheduled to receive current if it is not already receiving it.

In some embodiments, the channel request signal is used by the duty control logic circuitry to control the HS transistor and the LS transistor of the DCDC converter. The duty control logic circuitry may be configured to turn on the HS transistor when the channel request signal is asserted. The duty control logic circuitry may be configured to turn off the HS transistor and to turn on the LS transistor when the channel request signal is deasserted.

The circuit portion may comprise a multiplexer via which the channel request signal is provided to the duty control logic circuitry. The multiplexer may be configured to receive a plurality of channel request signals from the controller, each channel request signal corresponding to a respective one of the plurality of loads. The multiplexer may be configured to forward, to the duty control logic circuitry, the channel request signal corresponding to the under-supplied load in response to receiving a channel selection signal from the channel logic circuitry identifying the under-supplied load.

The controller may be configured, in response to detecting that the voltage across the under-supplied load is greater than the upper target voltage, to stop issuing said channel request signal identifying the under-supplied load. Thus, when a load has received sufficient current from the DCDC converter such that the voltage across the load reaches the upper target voltage, the controller stops issuing a channel request signal identifying said load as requiring additional current. This means that the output of the DCDC converter can be provided to a different load if necessary. The controller may be configured to detect when the voltages across one or more further loads are below respective thresholds (i.e. to detect a plurality of under-supplied loads). The controller may issue a plurality of channel request signals, each identifying a different under-supplied load, at the same time.

The controller may comprise one or more minimum-threshold comparators configured to compare the voltage provided to one or more of the loads with the first threshold associated with a given load. The controller may comprise a dedicated minimum-threshold comparator for each of the plurality of loads. Each of the one or more (dedicated) minimum-threshold comparators may be arranged to output a corresponding channel request signal upon detecting a (respective) under-supplied load.

In some embodiments, the upper target voltage is the same as the minimum target voltage. In some embodiments, there is inherent hysteresis in the one or more minimum-threshold comparators such that the minimum-threshold comparator only detects that the provided voltage is higher than the first threshold when the provided voltage has reached the upper target voltage. Thus, the one more minimum-threshold comparators may be configured to issue a channel request signal when the provided voltage is lower than the first threshold, and to stop issuing the channel request signal when the provided voltage is higher than the first threshold but, owing to the inherent hysteresis in the one or more minimum-threshold comparators, the channel request signal is only actually deasserted when a higher voltage (i.e. the upper target voltage) is reached.

However alternatively, the controller may comprise one or more upper-threshold comparators that are separate from the minimum-threshold comparators. Thus, the controller may comprise one or more upper-threshold comparators configured to compare the voltage provided to one or more of the loads with the corresponding upper target voltage. The controller may comprise a dedicated upper-threshold comparator for each of the plurality of loads. The (dedicated) upper-threshold comparator may be configured to disable the (respective) minimum-threshold comparator in response to detecting that the voltage provided to a corresponding load is greater than the corresponding upper target voltage. Thus, in such arrangements, when the voltage reaches the corresponding upper target voltage, the channel request signal (issued by the minimum-threshold comparator) is deasserted.

The channel logic circuitry may be configured to provide current from the output of the converter to the under-supplied load in response to receiving the channel request signal. The channel logic circuitry may comprise one or more channel selection switches (e.g. transistors), operable to selectively establish an electrical connection between the output of the DCDC converter and one or more of the plurality of loads. This allows the current provided by the DCDC converter to flow to the under-supplied load, thus increasing the voltage across the under-supplied load.

The channel logic circuitry may be configured to output a channel selection signal identifying the load that is to receive the output current from the DCDC converter.

In embodiments where the controller is configured to detect when the voltages across one or more further loads are below respective thresholds (i.e. to detect a plurality of under-supplied loads), the channel logic circuitry may be configured to determine which of the (under-supplied) loads is to be provided with the output current from the DCDC converter. The channel logic circuitry may make this determination in any suitable or desired way. The channel logic circuitry may make this determination according to a predetermined priority level associated with each of the plurality of loads. The channel logic circuitry may make this determination according to a difference between the voltage across each load and the corresponding minimum target threshold. The channel logic circuitry may be configured to determine a sequence in which current is to be provided to the loads. In some embodiments, the channel logic circuitry is configured to provide the output current from the DCDC converter to the plurality of under-supplied loads in an order that limits the amount of time that any particular load is under-supplied. The channel logic circuitry may provide the output current to the loads in the order in which their respective voltages fell below the first threshold—i.e. according to which channel request signals were generated first.

The voltage regulator may be arranged in parallel with the DCDC converter. In some embodiments, the voltage regulator comprises a low-dropout voltage regulator (LDO). The second threshold may be equal to the target voltage of the LDO. Thus, it will be appreciated that, when the voltage across the under-supplied load is below the second threshold, the LDO will begin to conduct.

This means that the LDO can be seamlessly brought into operation without the need for additional circuitry in order to effect a logical handover between the DCDC converter and the LDO. This means that the DCDC converter can be kept active together with the LDO. The LDO may draw only a small current when the voltage across the under-supplied load is above the second threshold and only be brought into use when it is needed to supply supplementary current to the output load.

In some embodiments, the circuit portion comprises a dedicated voltage regulator, such as an LDO, for each of the plurality of output loads. Each of the dedicated voltage regulators may have a different target voltage, depending on the requirements of the respective load.

BRIEF DESCRIPTION OF THE DRAWINGS

An embodiment of the invention will now be described, by way of non-limiting example only, with reference to the accompanying drawings, in which.

DETAILED DESCRIPTION

Figure 1:
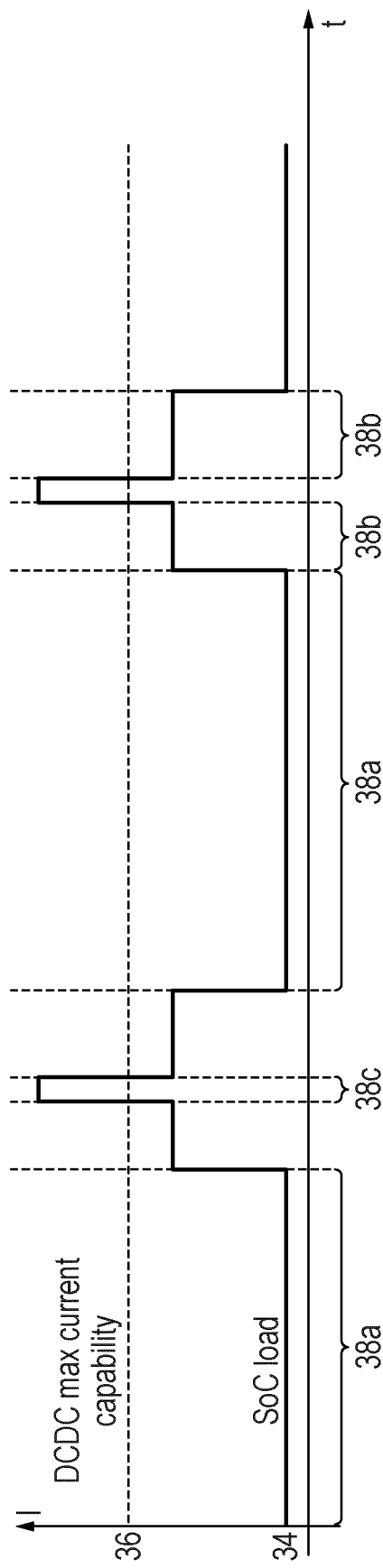
FIG. 1 is a graph showing a typical SoC load profile.

A typical load profile 34 for a SoC, comprising a SIMO DCDC Buck converter, is shown in FIG. 1.

The SoC load profile 34 is the total current I required by all of the loads on the SoC over time t. The maximum current that can be supplied by the Buck converter is shown by the horizontal dotted line 36. As can be seen in FIG. 1, the typical SoC load profile 34 comprises a number of very long low-load periods 38a, short moderate-load periods 38b and very short, and usually infrequent, heavy-load periods 38c. Such heavy-load periods 38c may be caused by the combination of an active radio frequency power amplifier and a high speed memory event, for example.

In FIG. 1 it is clear that the DCDC converter fails to deliver the current required by the SoC during the heavy-load periods 38c. Although this can be overcome by increasing the size of the DCDC converter to raise its maximum current capability, this can often result in a lower overall system efficiency, especially in the case of SIMO DCDC converters. Owing to the infrequency of such heavy-load periods 38c, it can be inefficient in terms of cost and power to implement a large DCDC converter when the upper range of its current capability is likely to be required so infrequently.

Figure 2:
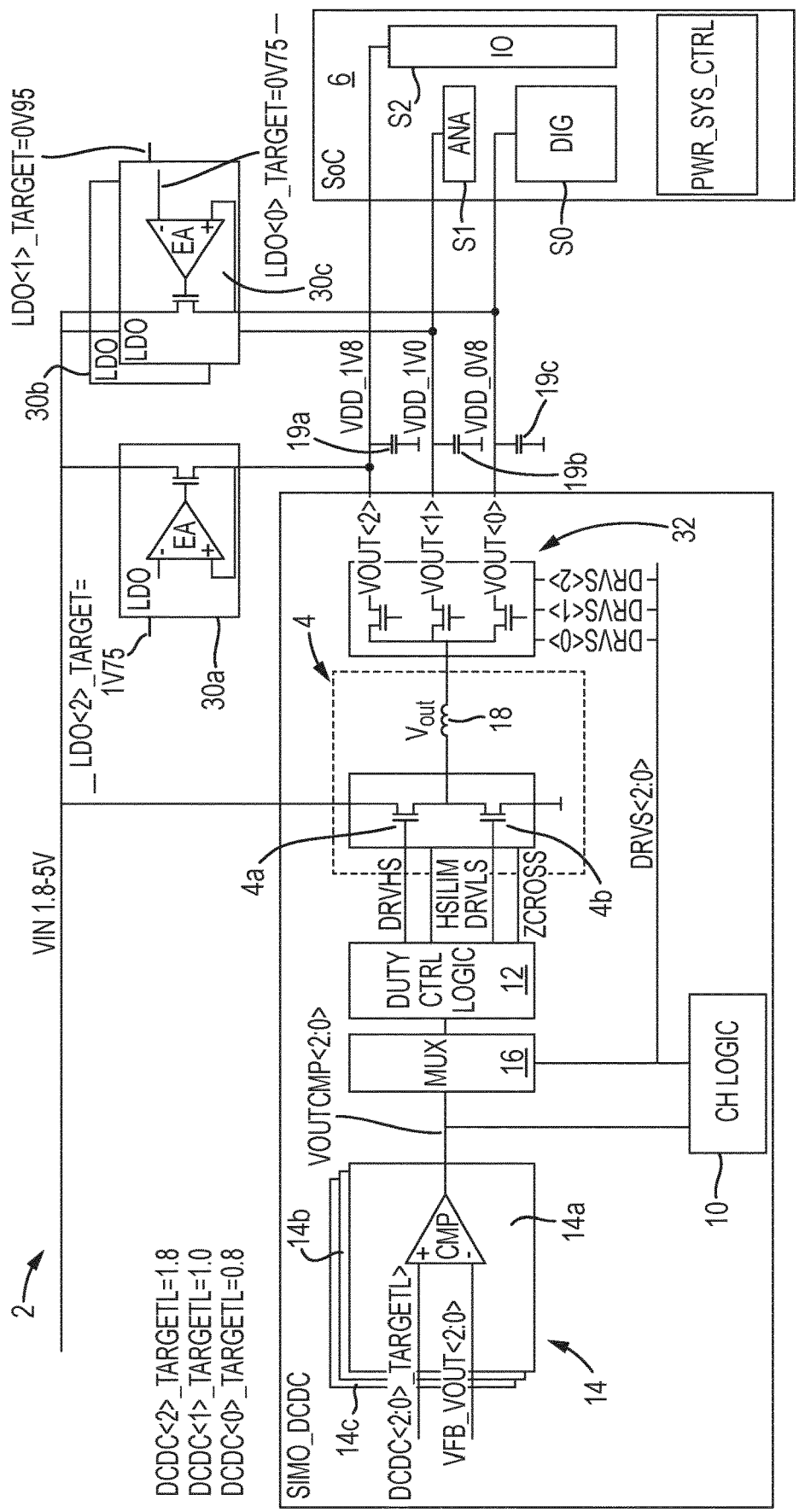
FIG. 2 is a schematic of a circuit portion in accordance with an embodiment of the present invention.

FIG. 2 shows a circuit 2 in accordance with an embodiment of the present invention. The circuit 2 is arranged on a system-on-chip (SoC) and comprises a single-input multiple-output (SIMO) step-down DCDC Buck converter 4 that receives an input voltage $V_{in}$ and provides a load current and load voltage $V_{out}$ to a domain 6. The domain 6 comprises three power channels that are independently electrically connected to the output of the Buck converter 4 to provide power to three loads S2, S1, S0 respectively.

The circuit 2 further comprises channel logic circuitry 10 that alternates the supply of power output from the Buck DCDC converter 4 between the three power channels and, thus, between the respective loads S2, S1, S0. Each power channel comprises a capacitor 19a, 19b, 19c that is charged while the DCDC converter 4 is providing current to the respective power channel, and subsequently discharges to provide current to the loads S2, S1, S0. As each capacitor 19a, 19b, 19c discharges, the voltage provided to the respective load S2, S1, S0 will decrease.

The circuit 2 further comprises a controller 14, a multiplexer 16 and duty control logic 12. The controller 14 comprises a minimum-threshold comparator 14a, corresponding to the load S2, that compares the voltage VOUT<2> supplied to the load S2 with a respective minimum target voltage DCDC<2>_TARGETL for the load S2. The controller 14 also comprises two further minimum-threshold comparators 14b, 14c, corresponding to loads S1 and S0, although, for simplicity, these are not shown in detail in FIG. 2. These further minimum-threshold comparators operate in the same way as the minimum-threshold comparator 14a described herein, but each is dedicated to its own load S1, S0 respectively. In this way, the controller 14 identifies which of the loads are under-supplied.

The voltage VOUT<2>, VOUT<1>, VOUT<0> supplied to the loads S2, S1, S0 may fall as a result of the discharging of the corresponding capacitor 19a,b,c. In response to determining that the voltage VOUT<2>, VOUT<1>, VOUT<0> supplied to the load S2, S1, S0 has fallen below the minimum target voltage DCDC<2>_TARGETL, DCDC<1>_TARGETL, DCDC<0>_TARGETL, (i.e. that one or more of the respective loads S2, S1, S0 is under-supplied) the minimum-threshold comparator 14a,b,c sends a channel request signal VOUTCMP2, VOUTCMP1, VOUTCMP0 to the channel logic circuitry 10 and to an input of the multiplexer 16.

The minimum-threshold comparators 14a,b,c are configured to stop issuing respective channel request signals VOUTCMP2, VOUTCMP1, VOUTCMP0 upon detecting that the supplied voltage VOUT<2>, VOUT<1>, VOUT<0> is greater than the respective minimum target voltage DCDC<2>_TARGETL, DCDC<1>_TARGETL, DCDC<0>_TARGETL. However, owing to inherent hysteresis in the minimum-threshold comparators 14a,b,c, this change is not made until the supplied voltage VOUT<2>, VOUT<1>, VOUT<0> reaches the respective upper target voltage DCDC<2>_TARGETH, DCDC<1>_TARGETH, DCDC<0>TARGETH, at which point the respective minimum-threshold comparator 14a,b,c ceases to output the channel request signal VOUTCMP2, VOUTCMP1, VOUTCMP0 for the corresponding channel to the channel logic circuitry 10 and the multiplexer 16.

The channel logic circuitry 10 determines, from the channel request signals VOUTCMP2, VOUTCMP1, VOUTCMP0 received from the controller 14, which of the output channels is to receive the output current from the Buck converter 4. The channel logic circuitry 10 issues channel selection signals DRVS<2>, DRVS<1>, DRVS<0> identifying the chosen output channel.

The channel selection signals DRVS<2>, DRVS<1>, DRVS<0> are provided to the multiplexer 16, which responds by forwarding the corresponding channel request signal VOUTCMP2, VOUTCMP1, VOUTCMP0 to the duty control logic circuitry 12. Channel selection switches 32 are also respectively controlled by the channel selection signals DRVS<2>, DRVS<1>, DRVS<0> and thus establish electrical connections between the Buck converter 4 and the loads S2, S1, S0 depending on the determination of the chosen channel by the channel logic circuitry 10.

If only one channel request signal VOUTCMP2, VOUTCMP1, VOUTCMP0 has been asserted at a particular time, the channel logic circuitry 10 will issue the channel selection signal DRVS<2>, DRVS<1>, DRVS<0> corresponding to that channel. If more than one channel request signal VOUTCMP2, VOUTCMP1, VOUTCMP0 is asserted at the same time, the channel logic circuitry 10 will make the determination as to which channel is to receive the output from the Buck converter 4 so that the length of time that a particular under-supplied channel is waiting to be supplied by the Buck converter 4 is minimised.

The duty control logic circuitry 12, in response to receiving channel request signals VOUTCMP2, VOUTCMP1, VOUTCMP0, issues duty control signals DRVHS, DRVLS to the HS and LS transistors 4a, 4b of the Buck converter 4 so that the required output current is delivered to the load S2, S1, S0. The duty control logic circuitry 12 monitors the current that flows through the inductor 18 during the charging period (while the HS transistor 4a is turned on) and outputs a current limiter signal HSILIM when a predetermined maximum current is reached. The current limiter signal HSILIM is issued as part of a regulation loop between the duty control logic circuitry 12 and the Buck converter 4. This regulation loop ensures that a fixed maximum amount of charge is delivered to each load per cycle in hysteretic (PFM) operation of the Buck converter 4.

The inductor 18 of the Buck converter 4 can be magnetised (charged) and demagnetised (discharged) depending on the configuration of the HS and LS transistors 4a, 4b. Thus the duty control signals DRVHS, DRVLS issued by the duty control logic circuitry 12 control when the inductor 18 charges and discharges.

The circuit 2 further comprises a low drop-out regulator (LDO) 30a connected in parallel with the Buck converter 4 between the input voltage source and the load S2. The circuit 2 comprises two further LDOs 30b, 30c connected in parallel with the Buck converter 4 between the input voltage source and the loads S1 and S0 respectively. These further LDOs 30b, 30c operate in the same way as the LDO 30a described herein, but each is dedicated to its own load S1, S0.

The target voltage of the LDO 30a is set just below the minimum target voltage DCDC<2>_TARGET for the DCDC converter 4. Thus, should the output voltage $V_{out}$ of the Buck converter 4 fall, the LDO 30a begins to conduct. Situations where this may occur will be described in more detail below.

Operation of the circuit 2 shown in FIG. 2 will now be described. The output of the circuit 2 is shown in FIG. 3.

Figure 3:
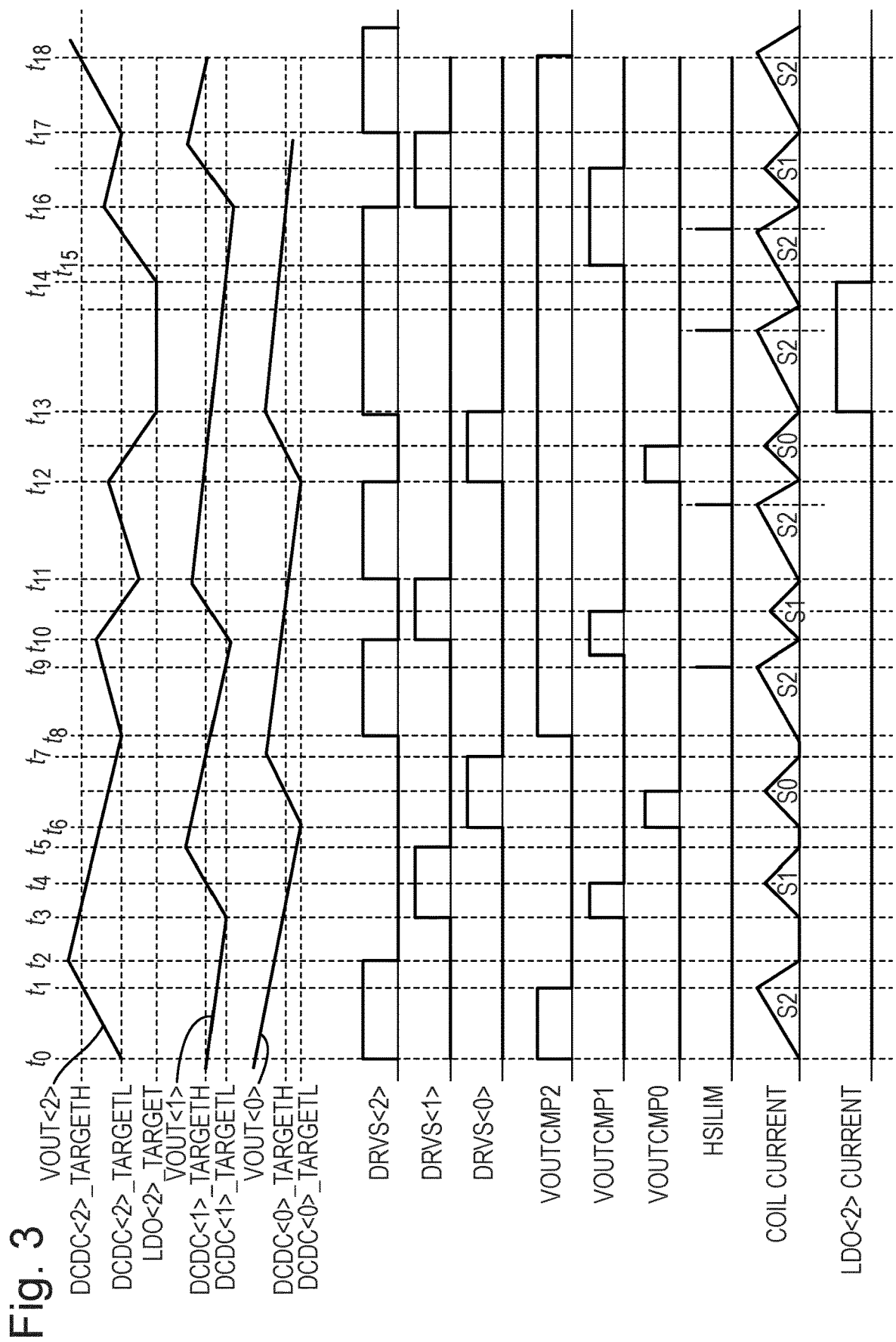
FIG. 3 is a graph of the outputs of the circuit shown in FIG. 2.

For each of the output loads S2, S1, S0 respectively, FIG. 3 shows traces of the voltage VOUT<2>, VOUT<1>, VOUT<0> supplied to each load S2, S1, S0, the channel selection signals DRVS<2>, DRVS<1>, DRVS<0> produced by the channel logic circuitry 10, and the channel request signals VOUTCMP2, VOUTCMP1, VOUTCMP0 produced by the controller 14. The minimum target voltage DCDC<2>_TARGETL (the first threshold voltage), the upper target voltage DCDC<2>_TARGETH (taking into account hysteresis in the respective minimum-threshold comparator 14a) and the LDO target voltage LDO<2>_TARGET for the load S2 are shown as horizontal dotted lines at the top of FIG. 3. The minimum and upper target voltages for the loads S1, S0 are also shown.

FIG. 3 also shows the current COILCURRENT that is supplied to the loads S2, S1, S0 by the Buck converter 4, the current LDO<2> CURRENT that is supplied to the load S2 by the corresponding LDO 30a and the trace of the signal HSILIM issued by the duty control logic circuitry 12.

In this exemplary embodiment, a logic high channel selection signal DRVS<2>, DRVS<1>, DRVS<0> indicates that the corresponding load S2, S1, S0 will receive the output current from the Buck converter 4.

At time $t_0$, it can be seen in FIG. 3 that the voltage VOUT<2> supplied to the load S2 is equal to the minimum target voltage DCDC<2>_TARGETL. Thus, the comparator 14a of the controller 14 issues a logic high channel request signal VOUTCMP2 to the channel logic circuitry 10 and the multiplexer 16. In response to the logic high channel request signal VOUTCMP2, the channel logic circuitry 10 issues a logic high channel selection signal DRVS<2>, thereby indicating that the load S2 is to receive the output current COILCURRENT from the Buck converter 4.

The channel selection signal DRVS<2> is provided to the multiplexer 16, which causes the multiplexer 16 to forward the channel request signal VOUTCMP2 to the duty control logic 12. The duty control logic 12 then turns on the HS transistor 4a of the Buck converter 4 (and turns off the LS transistor 4b) to cause the inductor 18 to charge. This results in an increase in the current COILCURRENT in the inductor 18 as shown by the rising slope. Consequently, the voltage VOUT<2> provided to load S2 also increases, as shown in the top trace in FIG. 3.

At time $t_1$, the minimum-threshold comparator detects that the voltage VOUT<2> has risen above the maximum target threshold DCDC<2>_TARGETH. This causes the minimum-threshold comparator 14a to cease outputting the channel request signal VOUTCMP2 to the duty control logic circuitry 12 via the multiplexer 16. As a result, the duty control logic circuitry 12 issues a low side duty control signal DRVLS (not shown in FIG. 3) that deactivates the HS transistor 4a of the Buck converter 4 and activates the LS transistor 4b. As a result, the current COILCURRENT in the inductor 18 is discharged, as shown by the falling slope. As the inductor 18 discharges, the voltage VOUT<2> provided to the load S2 continues to rise. At time $t_2$, the current COILCURRENT in the inductor 18 reaches zero, thus triggering a zero-cross comparator signal that causes the duty control logic circuitry 12 to deactivate the LS transistor 4b.

The channel logic circuitry 10, when the channel request signal VOUTCMP2 is not asserted, ceases outputting a logic high channel selection signal DRVS<2> when the zero-cross comparator signal is triggered at time $t_2$.

Between times $t_2$ and $t_8$, the capacitor 19a discharges to supply current to the load S2. This causes the voltage VOUT<2> provided to the load S2 to decrease (as shown by the falling slope of VOUT<2>). At time $t_3$, it can be seen in FIG. 3 that the voltage VOUT<1> supplied to the load S1 has dropped to the minimum target voltage DCDC<1>_TARGETL. Thus, the minimum-threshold comparator 14b of the controller 14 issues a logic high channel request signal VOUTCMP1 to the channel logic circuitry 10. In response to the logic high channel request signal VOUTCMP1, the channel logic circuitry 10 issues a logic high channel selection signal DRVS<1>, thereby indicating that load S1 is to receive the output current COILCURRENT from the Buck converter 4. The channel selection signal DRVS<1> causes the channel selection switches 32 to trigger so that the output of the Buck converter 4 is delivered to the load S1.

The channel selection signal DRVS<1> is also provided to the multiplexer 16, which causes the multiplexer 16 to forward the channel request signal VOUTCMP1 to the duty control logic 12. The duty control logic circuitry 12 then turns on the HS transistor 4a of the Buck converter 4 (and turns off the LS transistor 4b) to cause the inductor 18 to charge, as described above. This results in an increase in the current COILCURRENT in the inductor 18 as shown by the rising slope. Consequently, the voltage VOUT<1> provided to load S1 also increases, as shown in FIG. 3.

Between time $t_3$ and time $t_5$, the duty control logic circuitry 12 issues duty control signals DRVHS, DRVLS to control the HS and LS transistors 4a, 4b of the Buck converter 4 in the same way as described above. The controller 14 ceases outputting a logic high channel request signal VOUTCMP<1> when, at time $t_4$, the minimum-threshold comparator determines that the voltage VOUT<1> provided to the load S1 has reached the upper target voltage DCDC<1>_TARGETH corresponding to the load S1. This causes the duty control logic circuitry 12 to issue the low side duty control signal DRVLS indicating that the inductor 18 of the Buck converter 4 may begin to discharge as shown by the falling slope of COILCURRENT. The channel logic circuitry 10 ceases outputting a logic high channel selection signal DRVS<1> when the zero-cross comparator signal is triggered at time $t_5$.

At time $t_6$, the voltage VOUT<0> supplied to load S0 drops to the minimum target voltage DCDC<0>_TARGETL. Thus, between time $t_6$ and time $t_7$, current COILCURRENT is delivered to this load S0 in the same way as that described above.

At time $t_8$, the voltage VOUT<2> supplied to the load S2 once again drops to the minimum target voltage DCDC<2>_TARGETL. Thus, a logic high channel request signal VOUTCMP2 is asserted by the controller 14 and, in response, the channel logic circuitry 10 issues a logic high channel selection signal DRVS<2>. This causes current COILCURRENT to be supplied to the load S2 in the same way as described above.

At time $t_9$ the duty control logic circuitry 12 determines that the current provided to the inductor 18 has reached the predetermined maximum current and consequently issues the current limiter signal HSILIM. The current limiter signal HSILIM causes the duty control logic circuitry 12 to stop issuing high side duty control signal DRVHS and to issue a low side duty control signal DRVLS signal instead, thereby turning off the HS transistor 4a (and turning on the LS transistor 4b) so that the inductor 18 begins to discharge. Thus, the duty control logic circuitry 12 is configured such that it can begin the discharge portion of the charge-discharge cycle of the inductor 18 in response to either i) the channel request signal VOUTCMP2, VOUTCMP1, VOUTCMP0 being deasserted, as described above, or ii) receiving a current limiter signal HSILIM.

At time $t_{10}$ the voltage VOUT<1> supplied to the load S1 falls to the minimum target voltage DCDC<1>_TARGETL. This causes a logic high channel request signal VOUTCMP1 to be output from the minimum-threshold comparator 14b of the controller 14 to the channel logic circuitry 10.

However, it will be seen that a logic high signal VOUTCMP2 continues to be asserted by the minimum-threshold comparator 14a of the controller 14, as well as a logic high signal VOUTCMP1 by the minimum-threshold comparator 14b. The channel request signal VOUTCMP2 continues to be asserted because, during the time between time $t_8$ and time $t_{10}$, the voltage VOUT<2> provided to the load S2 failed to reach the upper target voltage DCDC<2>_TARGETH. Therefore, the minimum-threshold comparator 14b h continues to assert the channel request signal VOUTCMP2.

The channel logic circuitry 10 determines which of the output channels to activate, according to predetermined logic. If two or three of the channel request signals VOUTCMP2, VOUTCMP1, VOUTCMP0 are active (i.e. logic high) at the same time, the channel logic circuitry 10 cycles between the channels equally (e.g. according to the sequence 1-2-3-1-2-3 or 1-2-1-2). If a single channel is requesting statically (e.g. corresponding to load S2), the channel logic circuitry 10 will, by default, issue the channel selection signal (e.g. DRVS<2>) corresponding to that channel, but will switch to serve other channel request signals (e.g. VOUTCMP1 or VOUTCMP0) as and when they are received.

The logic to determine the chosen channel is configured so as to minimise the waiting time for a particular channel. Thus, the channel logic circuitry 10 is capable of determining how recently a particular channel was made active, and can use this information to determine the next channel to be made active.

In this case, at time $t_{10}$, the channel logic circuitry 10 switches the active channel from the channel supplying load S2 to the channel supplying load S1. This is done by ceasing to output channel selection signal DRVS<2> and instead outputting channel selection signal DRVS<1>.

During the period between $t_{10}$ and $t_{11}$, the current COILCURRENT is supplied to the load S1. However, the voltage VOUT<2> supplied to the load S2 continues to fall throughout this period and drops below the minimum target voltage DCDC<2>TARGETL. The channel request signal VOUTCMP2 is held at logic high by the comparator 14a of the controller 14 throughout this period. Therefore, when the channel selection signal DRVS<1> is deasserted at time $t_{11}$, the channel logic circuitry 10 switches the output channel to provide current COILCURRENT to the load S2, thus causing the output voltage VOUT<2> to increase.

The channel request signal VOUTCMP2 continues to be asserted throughout the entire period $t_{11}$ to $t_{12}$. This is because the voltage VOUT<2> provided to the load S2 does not reach the upper target voltage DCDC<2>_TARGETH, so the minimum-threshold comparator 14a continues to assert the channel request signal VOUTCMP2. The current limiter signal HSILIM is triggered, in the manner described above, to cause the inductor 18 to discharge.

At time $t_{12}$, the output voltage VOUT<0> provided to the load S0 drops to the minimum target voltage DCDC<0>_TARGETL, causing the channel to be switched from the channel supplying the load S2 to the channel supplying the load S0.

Between time $t_{12}$ and $t_{13}$, the output voltage VOUT<0> provided to the load S0 reaches the upper target voltage DCDC<0>_TARGETH, causing the minimum-threshold comparator to deassert the channel request signal VOUTCMP0. This causes the duty control logic circuitry 12 to stop issuing the high side duty control signal DRVHS and to issue a low side duty control signal DRVLS signal instead, thereby turning off the HS transistor 4a (and turning on the LS transistor 4b) so that the inductor 18 begins to discharge.

At time $t_{13}$, the channel logic circuitry 10 ceases outputting a logic high channel selection signal DRVS<0>, owing to the triggering of the zero-cross comparator, as described earlier. As the channel request signal VOUTCMP2 remains at logic high because the voltage VOUT<2> supplied to load S2 has not yet reached the upper target voltage DCDC<2>_TARGETH, the channel logic circuitry 10 outputs a logic high channel selection signal DRVS<2>, thus switching the channel to provide current COILCURRENT from the Buck converter 4 to the load S2.

Also at time $t_{13}$, because of the insufficient current previously supplied to S2, the output voltage VOUT<2> provided to the load S2 drops further to the target voltage LDO<2>_TARGET of the LDO 30a. As a result, the LDO 30a begins to conduct, thus providing current LDO<2> CURRENT to the load S2. By setting the target voltage LDO<2>_TARGET of the LDO 30a just below the minimum target voltage DCDC<2>_TARGETL for the Buck converter 4, as shown in FIG. 3, the need for dedicated logic circuitry to facilitate a handover between the Buck converter 4 and the LDO 30a is removed.

Thus, between the times $t_{13}$ and $t_{14}$, the Buck converter 4 is assisted by the LDO 30a in supplying current LDO<2>_CURRENT to the load S2. It is merely coincidental that, in this exemplary scenario, the LDO 30a begins to conduct at the same time that the Buck converter 4 is switched to supplying the load S2. It will be appreciated that the LDO 30a need not begin to conduct at the start of a cycle of the Buck converter 4, and that, in some scenarios, the Buck converter 4 may provide current COILCURRENT to one of the other loads S1, S0 while the LDO 30a is supplying current to the load S2.

At time $t_{14}$, the voltage VOUT<2> supplied to load S2 begins to rise above the target voltage LDO<2>_TARGET of the LDO 30a, Thus, at this point, the LDO 30a ceases to conduct and the voltage VOUT<2> is provided solely by the Buck converter 4. As can be seen in FIG. 3, the voltage VOUT<2> continues to rise between time $t_{14}$ and $t_{16}$. Once again, the inductor 18 is switched from charging to discharging by the current limiter signal HSILIM because the voltage VOUT<2> fails to reach the upper target voltage DCDC<2>_TARGETH.

At time $t_{15}$, the voltage VOUT<1> supplied to the load S1 drops below the minimum target voltage DCDC<1>_TARGETL causing the minimum-threshold comparator 14b to output a logic high channel request signal VOUTCMP1. Thus, when the channel selection signal DRVS<2> is deasserted at time $t_{16}$ because the zero-cross comparator has signalled that the current COILCURRENT delivered to the load S2 is zero, the channel logic circuitry 10 outputs a logic high channel selection signal DRVS<1>. As a result, the output channel is switched from supplying the current COILCURRENT from the Buck converter 4 to the load S2 to supplying the current COILCURRENT to the load S1 until the zero-cross comparator is triggered at time $t_{17}$.

As the channel request signal VOUTCMP2 corresponding to the load S2 is still asserted, the channel logic circuitry 10 outputs a channel selection signal DRVS<2> at time $t_{17}$, which causes the duty control logic circuitry 12 to turn on the HS transistor of the Buck converter 4. Therefore, current COILCURRENT is supplied to the load S2 as shown and the voltage VOUT<2> increases accordingly.

At time $t_{18}$, the voltage VOUT<2> reaches the upper target voltage DCDC<2>_TARGETH. Therefore, the minimum-threshold comparator 14a ceases to assert the channel request signal VOUTCMP2. As a result, the duty control logic circuitry 12 issues a low side duty control signal DRVLS to turn on the LS transistor 4b of the Buck converter 4, thereby causing the inductor 18 to discharge.

The output traces LDO<1> CURRENT, LDO<0> CURRENT of LDOs 32b, 32c are not shown in FIG. 3 as the voltages VOUT<1>, VOUT<0> for loads S1, S0 do not fall to the target voltages LDO<1>_TARGET, LDO<0>_TARGET respectively, for this example, and so the LDOs 32b, 32c do not begin to conduct. However, the LDOs 32b, 32c operate in the same way as the LDO 32a described above and so, under different SoC loading, may begin to conduct.

Thus it will be appreciated that the present invention provides a circuit that ensures output current capability for each of the loads of the SoC, whilst improving system efficiency and performance. The Applicant has identified that using a smaller DCDC converter, supported by LDOs in the manner described herein, can result in improved load efficiency, low converter peak currents, reduced chip size and low integration costs.

The invention claimed is:

1. A circuit portion comprising:
    a DCDC converter arranged to provide current from an output of the converter to one of a plurality of loads at a time;
    a controller configured to detect when a voltage across an under-supplied load of the plurality of loads from the DCDC converter is below a first threshold;
    channel logic circuitry configured to provide current from the output of the converter to the under-supplied load in response to the controller detecting that the voltage is below the first threshold; and
    a voltage regulator configured to provide current to the under-supplied load when the voltage is below a second threshold;
    wherein the controller is configured to detect a plurality of under-supplied loads and to determine which of the under-supplied loads is to be provided with the output current from the DCDC converter, wherein the channel logic circuitry is configured to determine how recently each of the plurality of under-supplied loads was provided with output current from the DCDC converter and use said determination to provide the output current from the DCDC converter to the plurality of under-supplied loads in an order that limits an amount of time that any particular load is undersupplied.

2. The circuit portion of claim 1, wherein the voltage regulator is arranged in parallel with the DCDC converter.

3. The circuit portion of claim 2, wherein the voltage regulator comprises a low-dropout voltage regulator.

4. The circuit portion of claim 3, wherein the second threshold is equal to a target voltage of the low-dropout regulator.

5. The circuit portion of claim 1 comprising a dedicated voltage regulator for each of the plurality of output loads.

6. The circuit portion of claim 1, wherein the controller is configured to monitor a voltage across each of the plurality of loads.

7. The circuit portion of claim 1, wherein the controller is configured, in response to detecting that the voltage across the under-supplied load is lower than the first threshold, to issue a channel request signal that identifies the under-supplied load.

8. The circuit portion of claim 7, wherein the controller is configured, in response to detecting that the voltage across the under-supplied load is greater than an upper target voltage, to stop issuing said channel request signal identifying the under-supplied load.

9. The circuit portion of claim 7 wherein the channel logic circuitry is arranged to use the channel request signal is to ensure that the identified under-supplied load is scheduled to receive current if the identified under-supplied load is not already receiving current.

10. The circuit portion of claim 7, wherein:
    the DCDC converter comprises a high side transistor, a low side transistor and an inductor;
    the DCDC converter is configured to charge the inductor when the high side transistor is turned on and to discharge the inductor when the low side transistor is turned on; and
    the circuit portion further comprises duty control logic circuitry configured to turn on the high side transistor when the channel request signal is asserted and to turn on the low side transistor when the channel request signal is de-asserted and/or circuitry configured to compare the current through the inductor with a maximum-current threshold and, in response to determining that the current through the inductor is greater than the maximum-current threshold, the duty control logic circuitry being configured to turn off the high side transistor and to turn on the low side transistor.

11. The circuit portion of claim 10 further comprising a multiplexer via which the channel request signal is provided to the duty control logic circuitry, wherein the multiplexer is configured to forward, to the duty control logic circuitry, the channel request signal corresponding to the under-supplied load in response to receiving a channel selection signal from the channel logic circuitry identifying the under-supplied load.

12. The circuit portion of claim 1, wherein the DCDC converter is configured to operate in discontinuous conduction mode.

* * * * *